C. F. CONANT.
WINDOW CLEANER.
APPLICATION FILED NOV. 20, 1912.
1,062,322.
Patented May 20, 1913.
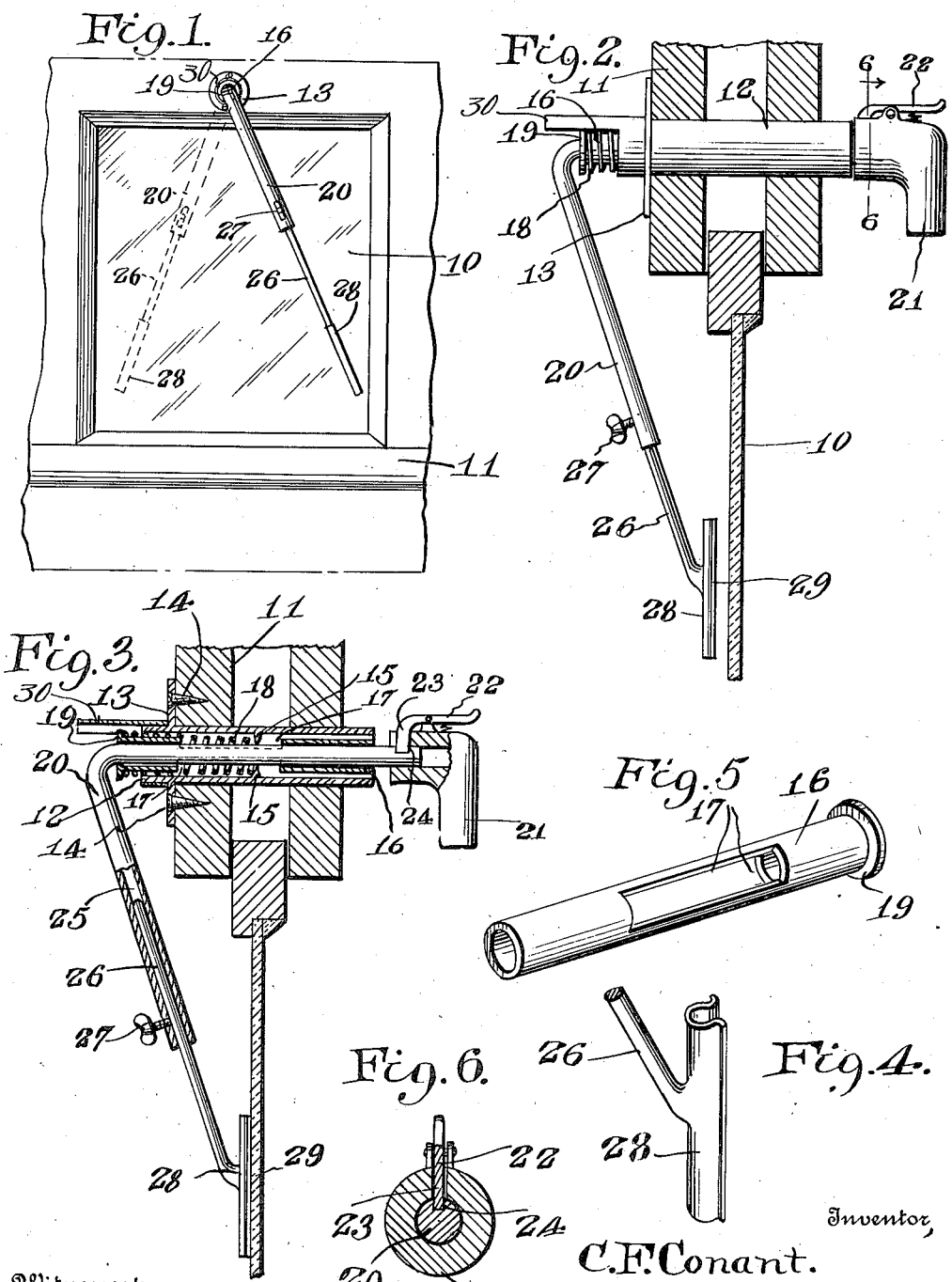
Inventor,
C. F. Conant.
Witnesses:—
J. P. Wahler
Francis Boyle
By Chamales Chamales
Attorneys

UNITED STATES PATENT OFFICE.

CLARENCE FRANKLIN CONANT, OF PORTLAND, OREGON.

WINDOW-CLEANER.

1,062,322.  Specification of Letters Patent.  Patented May 20, 1913.

Application filed November 20, 1912. Serial No. 732,484.

*To all whom it may concern:*

Be it known that I, CLARENCE F. CONANT, a citizen of the United States, residing at Portland, in the county of Multnomah, State of Oregon, have invented certain new and useful Improvements in Window-Cleaners; and I do hereby declare the following to be a full, clear, and exact description of the invention, such as will enable others skilled in the art to which it appertains to make and use the same.

This invention relates to window wipers and has for an object to provide a window wiper that may be easily and quickly attached to or removed from a vestibule window of a motor car, and will have a single spring for normally holding the wiper out of engagement with the window and for forming a cushion to prevent the wiper sharply striking against the window when being moved into engagement therewith.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a front elevation of the invention in applied position upon a vestibule window. Fig. 2 is a vertical sectional view through the window with the device shown in elevation and in normal position. Fig. 3 is a longitudinal sectional view through the window and through the device with the latter shown in active position. Fig. 4 is a detail perspective view of the wiper holder. Fig. 5 is a detail perspective view of the inner tube. Fig. 6 is a vertical sectional view taken on the line 6—6 Fig. 2.

Referring now to the drawing in which like characters of reference designate similar parts, 10 designates a vestibule window and 11 the window casing thereof. In the present embodiment of my invention I employ a tube 12 which is engaged through the window casing above the window and is equipped near the outer end with a circumferential flange 13 which is secured to the outside of the casing by screws 14 or similar connectors. The tube is provided internally substantially midway between the ends with stop lugs 15.

An inner tube 16 is slidably fitted and also revolubly fitted within the tube 12 and is of greater length than the latter. The inner tube is provided with longitudinal slots 17 as most clearly shown in Fig. 5, these slots receiving the stop lugs 15. A helical spring 18 encircles the inner tube and is confined between the stop lugs 15 and a terminal flange 19 projecting form the outer end of the inner tube. This flange normally holds the inner tube at its outer limit of movement in the outer tube 12 and also performs the function of a cushion to minimize shocks and jars as the inner tube is drawn rearwardly through the outer tube.

The wiper comprises a substantially V-shaped rod 20 one leg of which projects entirely through the inner tube and is equipped terminally with an L-shaped grip 21, connection between the leg and grip being made by a spring pressed pivoted pawl 22 having a terminal lug 23 which projects into a notch 24 formed in the leg as shown in Fig. 3. The other leg of the rod is formed at the end with a counterbore 25 into which the reduced end of the wiper handle 26 is adjustably secured by means of a set screw 27. The wiper handle is terminally equipped with curvilinear spring plates 28 which are adapted to embrace a rubber wiper 29.

To operate the device it is simply necessary to pull rearwardly upon the grip 21, the rod 19 being thereby carried bodily through the outer tube and carrying the inner tube along with it, while the wiper is carried into engagement with the window pane. The grip may now be twisted to rotate the rod 19 and swing the wiper in an arc upon the window pane as shown by dotted lines in Fig. 1. From the above description it will be seen that the helical spring 18 performs the dual function of holding the wiper out of engagement with the window pane and also forming a cushion which prevents the wiper from coming into sharp contact with and breaking the window pane.

For preventing snow and ice accumulating above the arm 20 and impeding the proper working of the latter, I provide a shield 30 which overhangs the arm 20 and is provided with a terminal collar that is fixedly secured to the outer end of the tube 12.

What is claimed, is:—

A window wiper including an outer tube having internal stop lugs, an inner tube slidably and revolubly fitted in said outer tube and having oppositely disposed longitudinal slots receiving said stop lugs, a flange on the outer end of said inner tube, a helical spring on said inner tube confined between said flange and said stop lugs and normally holding said inner tube at the outer limit of its movement, a substantially V-shaped rod having one leg projecting through said inner tube and terminally equipped with a removable grip, and a wiper on the other leg of said rod.

In testimony whereof, I affix my signature, in presence of two witnesses.

CLARENCE FRANKLIN CONANT.

Witnesses:
 NEIL SMITH,
 W. G. DEATSMAN.